United States Patent [19]

Drori

[11] 3,888,393
[45] June 10, 1975

[54] INJECTION MOLDER WITH RAM MOVABLE INDEPENDENTLY OF SCREW FEEDER

[76] Inventor: Mordeki Drori, 89 Zahal St., Kiron, Israel

[22] Filed: Jan. 22, 1974

[21] Appl. No.: 435,528

[52] U.S. Cl. .............. 222/229; 222/246; 222/413; 425/207; 425/245 R
[51] Int. Cl. .............................................. B29f 1/04
[58] Field of Search ........................ 259/191–193; 425/205, 207, 208, 244, 245; 222/229, 246, 413

[56] References Cited
UNITED STATES PATENTS

| | | | |
|---|---|---|---|
| 3,319,299 | 5/1967 | Kiraly | 425/245 X |
| 3,398,435 | 8/1968 | Nouel | 425/245 X |
| 3,436,443 | 4/1969 | Hutchinson | 425/244 UX |
| 3,481,001 | 12/1969 | Stillhard | 425/205 X |
| 3,501,810 | 3/1970 | Powell | 425/245 X |

FOREIGN PATENTS OR APPLICATIONS

| | | | |
|---|---|---|---|
| 96,927 | 2/1961 | Netherlands | 425/205 |
| 1,921,058 | 11/1970 | Germany | 425/245 |

*Primary Examiner*—Robert B. Reeves
*Assistant Examiner*—David A. Scherbel
*Attorney, Agent, or Firm*—Benjamin J. Barish

[57] ABSTRACT

An injection unit particularly for injection moulding machines comprises a barrel carrying an injection nozzle at one end, a screw feeder feeding the material to be injected towards the nozzle end of the barrel, and a ram axially movable within the barrel independently of the screw feeder for injecting the material through the nozzle. The unit further includes an annular ring enclosing a portion of the ram shaft and partitioning the nozzle end of the barrel into a filling or storage chamber, and an injection chamber, with the space between the ring and ram shaft constituting a passageway between the two chambers. The ram shaft carries a valve member which seats against the ring upon thhe forward movement of the ram to close the passageway, the passageway being opened to reestablish communication between the two chambers upon the return movement of the ram.

10 Claims, 5 Drawing Figures

INJECTION MOLDER WITH RAM MOVABLE INDEPENTLY OF SCREW FEEDER

BACKGROUND OF THE INVENTION

The present invention relates to injection units, and particularly to such units for injection moulding machines including blow moulding machines and combined blow moulding and injection moulding machines.

In one known type of injection moulding machine, the material to be injected is supplied to the injection cylinder by means of a feeding screw located in a separate cylinder above the injection cylinder. The latter cylinder includes a piston which injects the material supplied by the screw. A complete cycle of operation involves a separate feeding phase and a separate injection phase, the latter being performed after the former has been completed. Thus, during the entire material-filling operation effected by rotation of the screw, the injection piston is in its backward or inactive position, and after the screw has filled the space between its forward end and the injection nozzle, it ceases to rotate and the piston begins to move forwardly to effect the injection. After the injection has been completed, the piston returns and the feeding screw starts to rotate again to supply a new batch of material for injection.

In another type of injection machine, the screw is used both for feeding the material and also for injecting it. Thus, the screw rotates in the barrel to feed the material towards the injection nozzle, the screw backing away from the nozzle as the space between its forward end and the nozzle is filled with the material. The material is heated and rendered plastic during this feeding process. The rotation of the screw terminates as soon as the space between it and the nozzle is filled, the screw having also reached the rearwardmost position preset at the beginning of the operation. The screw is then moved forwardly towards the nozzle to inject the material therethrough into the mould. The injection pressure is applied for a predetermined time period, after which, the screw is returned to its initial position to start a new injection cycle.

One of the the main drawbacks in machines of the foregoing types is the relatively long time period required for the injection cycle, since each step in the cycle is performed serially and is completed before the next step in the cycle can start.

The cycle period is particularly long in those processes involving the injection of a large amount of material, for example when producing large articles or when using plural-cavity moulds, or when a slow feeding rate is required because of the nature of the material being processed. With respect to the latter consideration, some of the newly developed materials (such as polycarbonates, acetals, and fiber-glass containing resins) require a slow feeding rate to avoid undue heating because of the friction resulting during the feeding operation.

Since the production time required for producing a product in an injection moulding machine is the sum of the time periods required for: (1) filling the barrel and producing the melt, (2) injecting the material, (3) applying injection pressure to the mould, (4) cooling the product, and (5) ejecting the product from the mould, it will be appreciated that an arrangement which enables any of these operations to be performed concommitently or in parallel will significantly shorten the overall production time.

SUMMARY OF THE INVENTION

An object of the present invention is to provide an injection unit, particularly for injection moulding machines, in which the overall production time may be substantially shortened by an arrangement which enables the filling operation to take place at the same time as some or all of the other above-mentioned operations involved in a complete machine cycle.

According to the present invention, the injection unit includes a barrel carrying an injection nozzle at one end, a feeding device for feeding the material into the barrel and towards the nozzle end thereof, and a ram axially movable within the barrel independently of the feeding device for injecting the material through the nozzle. The injection unit further includes a partition member disposed within the barrel at the nozzle end, between the feeding device and the ram head, and dividing the nozzle end of the barrel into a filling chamber for receiving the material from the feeding device, and an injection chamber for injecting the material through the nozzle by the ram head. This partition member includes a passageway establishing communication between the filling chamber and the injection chamber. The injection unit further includes a valve member actuated to close this passageway upon the forward, injection movement of the ram head towards the nozzle, and to open the passageway to establish communication between the filling chamber and the injection chamber upon the return movement of the ram head away from the nozzle.

It will thus be seen that by providing the separate filling and injection chambers, and the ram movable independently of the feeding device, the filling operation need not stop but may continue during the time of the injection operation, and possibly of one or more of the other operations, thereby substantially reducing the overall machine cycle period.

In the preferred embodiments of the invention described below, the partition member is an annular ring enclosing a portion of the ram shaft, the ring having an outer diameter equal to the inner diameter of the barrel and an inner diameter greater than the outer diameter of the enclosed portion of the ram shaft. The space between the ring and the enclosed portion of the ram shaft thus constitutes the passageway between the filling and injection chambers. The ram shaft carries the valve member which seats against one end of the ring to close the passageway upon the forward movement of the ram head towards the nozzle, and unseats from the ring to open the passageway upon the return movement of the head away from the nozzle.

Also in the preferred embodiments of the invention described below, the ring is movable within the barrel, so that it moves with the ram by the seating of the valve member thereagainst upon the forward movement of the ram head, the ram head including a return member which engages the ring and returns it to its initial position upon the return movement of the ram head.

In one described embodiment, the feeding device is a screw feeder rotatable within the barrel independently of and coaxial with the ram.

In another described embodiment, the feeding device is a screw feeder also rotatable independently of the ram, but in a second barrel, the second barrel being attached to the first barrel and communicating with the filling chamber thereof.

According to still further features of the invention, the injection unit includes means enabling presetting the initial positions of the ram and of the screw feeder, and thereby the dimensions of the injection chamber and the filling chamber.

Further features and advantages of the invention will be apparent from the description below.

BRIEF DESCRIPTION OF THE DRAWINGS

The invention is herein described, by way of example only, with respect to two preferred embodiments illustrated in the drawings, in which.

DESCRIPTION OF THE FIGS. 1–4 EMBODIMENT

Figure 1:
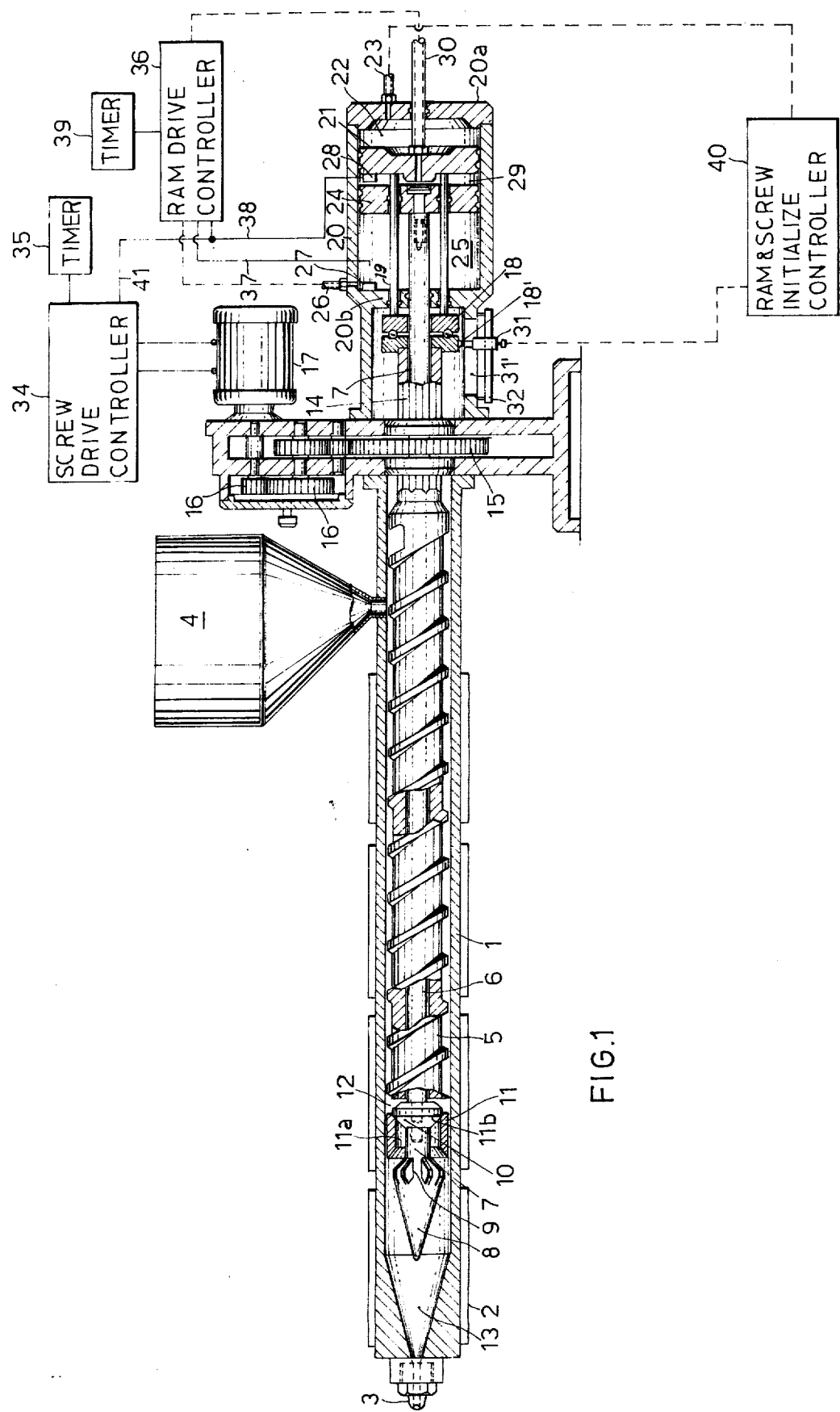
FIG. 1 is a longitudinal sectional view of one form of injection unit constructed in accordance with the invention, the ram being illustrated in the position assumed at the start of the injection operation.

The injection unit illustrated in FIG. 1 comprises a barrel 1 surrounded by heating coils 2, an injection nozzle 3 at one end of the barrel, and a hopper 4 for feeding the material, such as plastic, to be injected, all as known per se.

A feeding screw 5 is rotatably disposed within barrel 1 for feeding the material from hopper 4 towards the nozzle end of the barrel. Screw 5 has a through-going axial bore 6. A ram including a shaft 7 and head 8 is movable within bore 6 coaxial to the screw and barrel. The ram head 8 is conically-shaped, and its rear end is axially fluted as shown at 9. A valve member 10 is fixedly mounted to ram shaft 7 slightly behind ram head 8.

An annular ring 11 is disposed within barrel 1 between valve member 10 carried by ram shaft 7, and ram head 8. Ring 10 has an outer diameter equal to the inner diameter of the barrel, and an inner diameter greater than the outer diameter of the enclosed portion of ram shaft 7. This ring constitutes a partition dividing the nozzle end of the barrel into two chambers, namely a storage or filling chamber 12 for receiving the material fed by screw 5, and an injection chamber 13 for receiving the material injected by the ram through nozzle 3. The space 11a between the ring and the enclosed portion of the ram shaft 7 constitutes a passageway establishing communication between the two chambers. This passageway is closed upon the engagement of valve member 10 with one end (the right end, FIG. 1) of ring 11, that end of the ring preferably being bevelled as shown at 11b for this purpose.

As will be described below, valve member 10 seats against the right end of ring 11, thereby closing passageway 11a, during the forward or injection movement of the ram, and unseats from the ring to open the passageway during the return movement of the ram. During the latter movement of the ram, valve 10 first unseats from the ring, thereby opening passageway 11a, and soon thereafter the fluted end 9 of the ram head engages the opposite end of the ring to move the ring along with the ram during its return movement, the valve being open during this return movement.

Feeding screw 5 is rotated by means of axially-extending gear teeth 14 meshing with a gear 15 driven by a gear-train 16. Train 16 in turn is driven by a motor 17, which may be electric or hydraulic.

The rear end of screw 5 is coupled, via a thrust bearing 18 and axial rods 19 passing through a cylindrical extension 20 of barrel 1, to a piston 21 displaceable within cylinder 20. A chamber 22 is thus defined between piston 21 and the end wall 20a of cylinder 20, the pressure in which chamber may be controlled by a fluid line 23 (e.g. hydraulic).

The rear end of ram shaft 7 is fixed to another piston 24 also displaceable within cylinder 20. Piston 24 defines, with end wall 20b of cylinder 20, a chamber 25 whose internal pressure may be controlled by a fluid line 26. End wall 20b carries a limit switch 27 which is engaged by piston 24 at the forwardmost position of the ram. The rearwardmost, or starting, position of the ram is determined by a further limit switch 28 carried by a piston 21.

The two pistons 21 and 24 define between them a chamber 29 whose pressure may be controlled by a fluid line connected to a conduit 30 passing through piston 21 and end wall 20a.

A further limit switch 31 is provided to determine the starting position of screw 5. Limit switch 31 is axially presettable along a support 32, and its switch operator projects through an axial slot 31' formed in cylinder 20 so as to be engageable by a projection 18' carried by thrust bearing 18 coupled to the rear end of feeding screw 5.

It will thus be seen that the feeding screw 5 is driven independently of the ram 8. The separate drives may also be independently controlled. Thus, in FIG. 1 the controller for screw drive motor 17 is schematically represented by box 34, which controller may also include a timer 35. Similarly, the controller for the ram drive, namely piston 24 movable within cylinder 20, is schematically illustrated by block 36 which controls the pressure of the fluid applied to lines 26 and 30 on opposite sides of piston 24. The ram drive controller also includes the limit switches 27 and 28, as shown by lines 37, 38, and may also include a timer as shown by block 39. Finally, the controller of piston 21, which determines the initial position of the ram and screw, is schematically illustrated by block 40 controlled by limit switch 31, controller 40 controlling the pressure within chamber 22 as shown by its broken-line connection to line 23. Controllers and timers of the type schematically indicated in FIG. 1 are known per se, and therefore further details are not deemed necessary.

The injection unit illustrated is capable of performing a large number of different operations for a wide variety of applications.

FIG. 1 illustrates the injection unit in the condition at the start of an injection operation, wherein injection chamber 13 is charged with the material, and the ram 8 is in its initial or retracted position. The ram is driven forwardly towards injection nozzle 3 by ram drive controller 36, which connects line 30 to a high pressure and line 26 to a low pressure; this causes piston 24 to move leftwardly within cylinder 20, thereby moving ram 8 towards injection nozzle 3. This forward movement of the ram brings valve member 10 against ring 11, closing passageway 11a connecting the filling chamber 12 with the injection chamber 13, so that the material within the injection chamber is forced by the ram through nozzle 3 into the mould (not shown).

Figure 2:
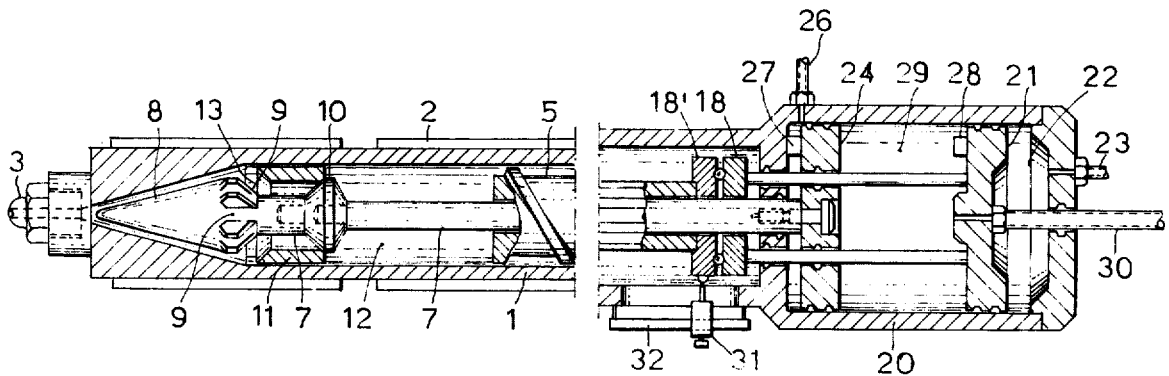
FIG. 2 is a corresponding view illustrating the ram at the end of the injection operation.

This is the condition of the injection unit as illustrated in FIG. 2, wherein it will be seen that ram 8 has been moved up to nozzle 3, and ring 11 has been carried with it to this forward position of the ram.

The injection unit may be controlled so that with the beginning of the forward movement of ram 8, feeding screw 5 starts to rotate to feed the material from hopper 4 into filling chamber 12. This is schematically illustrated by the electrical connection 41 from limit switch 28 to controller 34 for the screw drive, so that as soon as the ram starts its forward movement as detected by limit switch 28, screw 5 begins to rotate. Thus, the screw is continuously feeding material from hopper 4 into filling chamber 12 of the barrel while ram 8 is moving forwardly during the injection stroke.

Alternatively, the screw could be controlled so that it continuously feeds the material, since filling chamber 12 which receives the material continuously communicates with injection chamber 13 via space 11a, except when the ram is moving forwardly.

The forward movement of the ram continues until the mould is filled. At that time the opposition of the material to further compression terminates the forward movement of the ram. Such control arrangements, which are known per se, can be included within the ram drive controller 36. In any event, the forward movement of the ram will terminate when piston 24 reaches limit switch 27, as shown by the electrical connection 37 of that switch to the ram drive controller 36.

At the completion of the forward stroke of the ram, there is usually a dwell period in which the injection pressure is applied to the material within the mould while the material cools and hardens. This dwell period is controlled by timer 39, also known per se. After the predetermined dwell period has elapsed, timer 39 actuates controller 36 to initiate the return movement of the ram.

Figure 3:
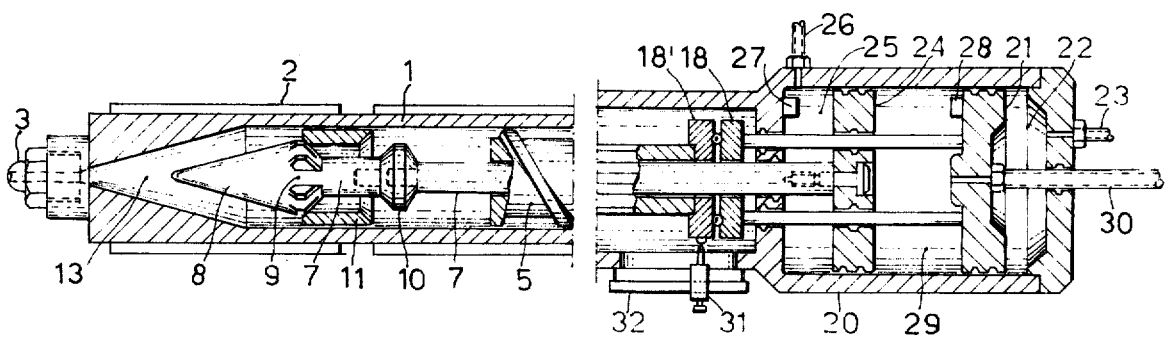
FIG. 3 is a corresponding view illustrating the ram being returned to its initial position after completing the injecting operation.

During this return movement, which is illustrated in FIG. 3, valve member 10 unseats from ring 11 so as to reestablish the communication between filling chamber 12 and injection chamber 13. Thus, the material previously fed, and continuing to be fed, into filling chamber 12 is now permitted to pass through space 11a of the ring and the flutes 9 of the ram head into the injection chamber 13 as the ram returns to its initial position. After the ram has moved a slight distance, sufficient to unseat valve member 10 from ring 11, the ram also returns the ring to its initial position. This return movement of the ram continues until its piston 24 engages limit switch 28.

It will be appreciated that during this entire time period in which the ram moves forwardly, dwells and returns, screw 5 rotates to continuously supply the material to filling chamber 12 and, during the return movement of the ram, to injection chamber 13. The arrangement illustrated thus enables a substantial reduction to be made in the complete operation cycle of the injection unit.

The injection unit illustrated may be operated so that screw 5 is not axially displaced during its rotation, the material it feeds merely filling chambers 12 and 13. Alternatively, the unit could be operated so that, during this filling operation, screw 5 is displaced (rightwardly) by the build-up of pressure within the barrel, this displacement of the screw also causing piston 21 to be displaced within cylinder 20. If screw 5 and piston 21 are displaced, they are initialized by controller 40 which applies pressure via line 23 into chamber 22 until projection 18' of thrust bearing 18 engages limit switch 31. Screw 5 will be coupled to its gear 15 drive in any axial position of the screw by virtue of its elongated gear teeth 14.

Since different products may require different quantities of material, the apparatus illustrated also permits presetting or preadjusting the dimensions of filling chamber 12 and injection chamber 13 so as to accommadate the quantity of material required for any special application.

Figure 4:
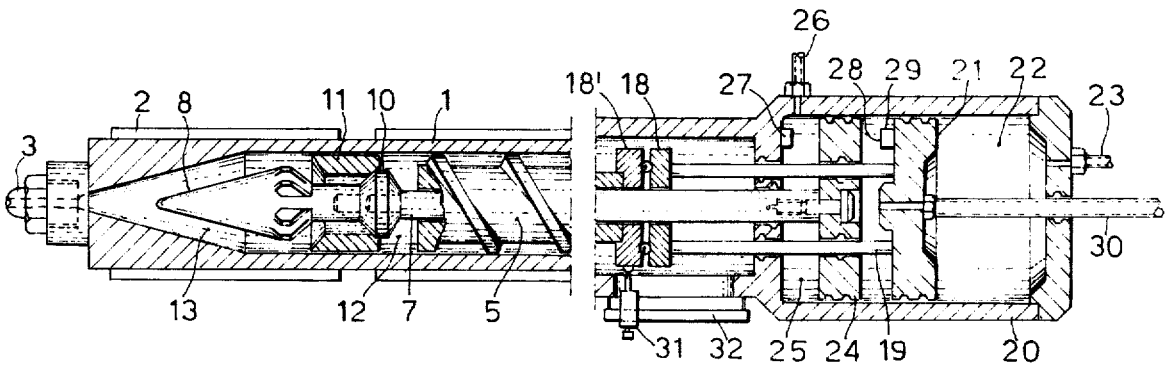
FIG. 4 is a corresponding view illustrating how the ram and screw feeder are preset to a different starting position in order to vary the dimensions of the filling and injection chambers.

The latter feature is particularly illustrated in FIG. 4. It is effected by presetting switch 31 axially along support 32 to the appropriate position according to the quantity of material required in the injection operation. Thus, by moving switch 31 leftwardly, to the position shown in FIG. 4, this causes the initial position of piston 21 to also be displaced leftwardly. This initial position of piston 21 determines the initial position of screw feeder 5, by virtue of the coupling thereto via rods 19 and thrust bearing 18, and also determines the initial position of ram 8 by virtue of limit switch 28 carried by piston 21. Thus, merely presetting the position of the single limit switch 31 effects the presetting of the initial positions of both the screw 5 and ram 8, and thereby the initial dimensions of the filling chamber 12 and the injection chamber 13.

THE FIG. 5 EMBODIMENT

Figure 5:
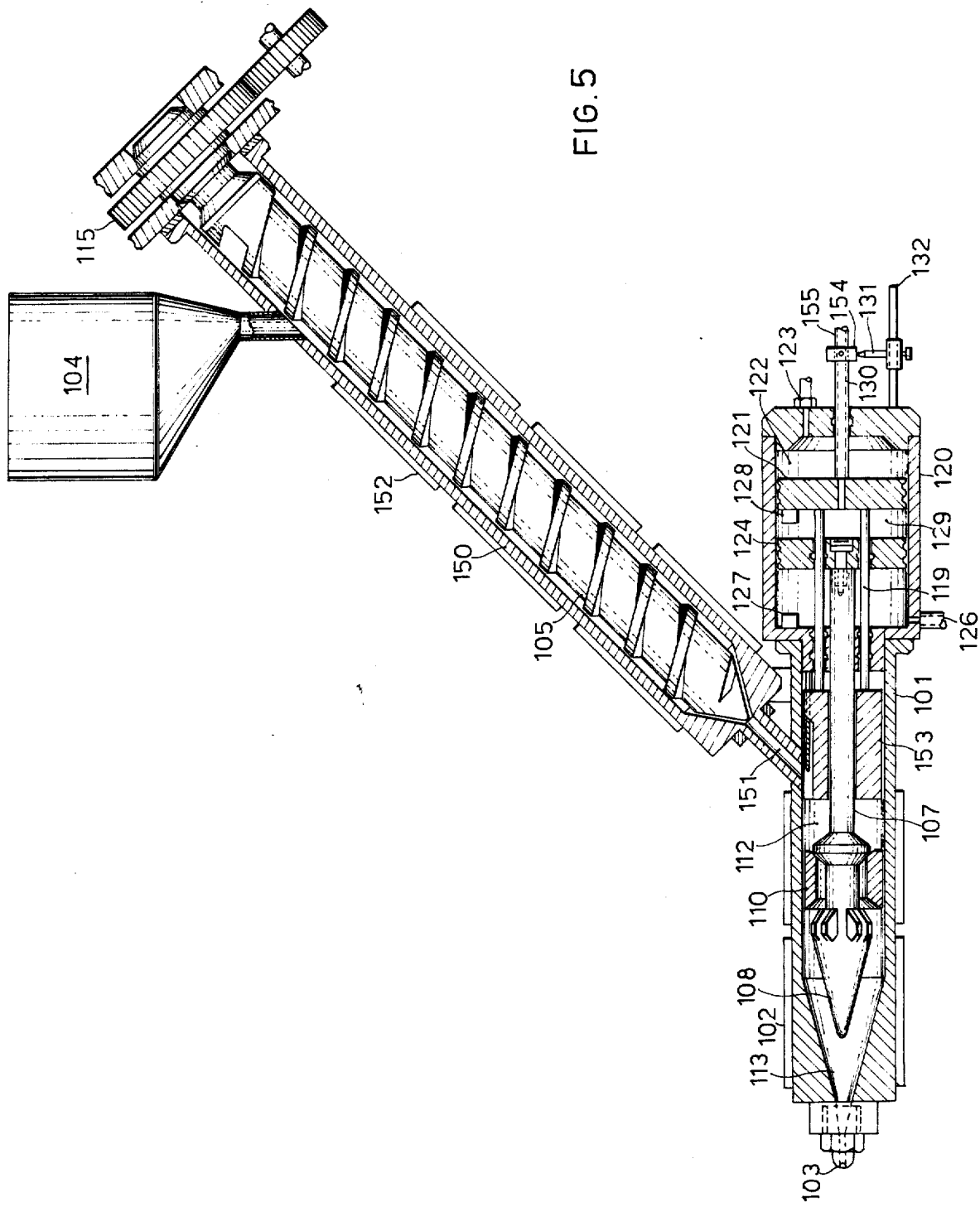
FIG. 5 is a longitudinal sectional view of another form of injection unit constructed in accordance with the invention.

FIG. 5 illustrates a variation in the injection unit of FIGS. 1–4. For the sake of brevity, similar parts are identified by the same reference numbers as in FIGS. 1–4, but increased by "100," and are not described herein in detail.

An important difference in the FIG. 5 embodiment is that the screw feeder 105, for feeding the material from the hopper 104 to the filling chamber 112, is not disposed within barrel 101 and coaxial with ram 108, as in the FIGS. 1–4 embodiment, but rather is disposed in a separate barrel 150 attached to barrel 101 and communicating, via passageway 151, with the inlet chamber 112. Barrel 150 may also include heating elements 152, corresponding to heating elements 102 of barrel 101.

The arrangement illustrated in FIG. 5 also includes an arrangement by which piston 121 (corresponding to piston 21 in FIGS. 1–4) is enabled to preset the initial position of ram 108 to accomodate different quantities of material. In this case, however, the initial position of screw feeder 105 is not preset (as in FIGS. 1–4), but rather a spacer member 153 movable within filling chamber 112 is preset by piston 121 in order to vary the dimensions of the filling chamber. The initial position of piston 121 is preset by limit switch 131 adjustably mounted in an axial direction on support 132, this switch being engageable by an actuator 154 carried by conduit 155 attached to piston 121.

Thus, as in the FIGS. 1–4 arrangement, the dimensions of filling chamber 112 and the injection chamber 113 may also be preset by limit switch 131.

It will be appreciated that if the injection unit of either FIGS. 1–4 or FIG. 5 is to be used with a constant quantity of material to be injected, there would be no need to enable presetting the dimensions of the filling and injection chambers, and therefore the elements included in both embodiments for that purpose may be omitted. It will also be appreciated that various other controls could be used for the screw conveyor and ram.

Many other variations, modifications, and applications of the illustrated embodiments will be apparent.

I claim:

1. An injection unit particularly for injection moulding machines, comprising: a barrel carrying an injection nozzle at one end; a feeding device feeding the material to be injected into the barrel and towards the nozzle end thereof; a ram including a head and a drive shaft axially movable within the barrel independently of the feeding device for injecting the material through the nozzle; said feeding device being a screw feeder rotatable within said barrel independently of and coaxial with the ram; a partition member disposed within the barrel at the nozzle end thereof between the feeding device and the ram head and dividing the nozzle end of the barrel into a filling chamber for receiving the material from the feeding device, and an injection chamber for injecting the material through the nozzle by the ram head; said partition member including a passageway establishing communication between the filling chamber and injection chamber; and a valve member actuated to close said passageway upon the forward, injection movement of the ram head towards the nozzle, and to open said passageway to establish communication between the filling chamber and the injection chamber upon the return movement of the ram head away from the nozzle.

2. An injection unit as defined in claim 1, further including first drive means for driving said feeding device, and second drive means for driving said ram independently of said feeding device.

3. An injection unit as defined in claim 1, wherein said partition member is an annular ring enclosing a portion of the ram shaft, said ring having an outer diameter equal to the inner diameter of the barrel and an inner diameter greater than the outer diameter of the enclosed portion of the ram shaft, the space between the ring and enclosed portion of the ram shaft constituting said passageway, said ram shaft carrying the valve member which seats against one end of the ring to close the passageway upon the forward movement of the ram head towards the nozzle, and unseats from the ring to open the passageway upon the return movement of the ram head away from the nozzle.

4. An injection unit as defined in claim 3, wherein said ring is movable within the barrel so that it moves with the ram by the seating of the valve member thereagainst upon the forward movement of the ram head, the ram head including a return member which engages the ring and returns same to its initial position upon the return movement of the ram head.

5. An injection unit particularly for plastic injection moulding machines comprising: a barrel carrying an injection nozzle at one end; a screw feeder feeding the material to be injected towards the nozzle end of the barrel; a ram including a head and a drive shaft axially movable within the barrel independently of the screw feeder for injecting the material through the nozzle; an annular ring enclosing a portion of the ram shaft and having an outer diameter equal to the inner diameter of the barrel and an inner diameter greater than the outer diameter of the enclosed portion of the ram shaft; said ring thereby partitioning the nozzle end of the barrel into a filling chamber and an injection chamber, with the space between the inner surface of the ring and the outer surface of the enclosed portion of the ram shaft constituting a passageway establishing communication between the two chambers; a valve member carried by the ram shaft at the feeding chamber side of the partition ring and adapted to seat against said ring upon the forward movement of the ram; and a return member carried by the ram head at the injection chamber side of the partition ring and adapted to engage the ring to move same away from the valve member upon the return movement of the ram.

6. An injection unit as defined in claim 5, further including first drive means for driving said feeding device, and second drive means for driving said ram independently of said feeding device.

7. An injection unit as defined in claim 5, wherein said ram is movable independently of the screw feeder, by means of a piston fixed to the ram and displaceable within a cylinder coaxial with the barrel.

8. An injection unit as defined in claim 7, further including a second piston movable within said cylinder with respect to said first piston, said second piston including a limit switch to preset the initial position of the ram and thereby the dimensions of the injection chamber.

9. An injection unit as defined in claim 8, wherein said screw feeder is disposed within said barrel coaxial with the ram, and said unit further includes a connection between the screw feeder and said second piston for presetting the initial position of the screw feeder within the barrel and thereby the initial dimensions of the filling chamber.

10. An injection unit as defined in claim 8, wherein said screw feeder is disposed in a second barrel attached to the first barrel and communicating with the filling chamber thereof, the first barrel including a spacing device coupled to said second piston for presetting the initial position of the spacing device and thereby the initial dimensions of the filling chamber.

* * * * *